(12) United States Patent
Miglia

(10) Patent No.: US 6,419,036 B1
(45) Date of Patent: Jul. 16, 2002

(54) VEHICLE FOR WHEEL CHAIRS

(76) Inventor: David A. Miglia, P.O. Box 576, Gypsum, CO (US) 81637

( * ) Notice: Subject to any disclaimer, the term of this patent is extended or adjusted under 35 U.S.C. 154(b) by 0 days.

(21) Appl. No.: 09/460,817

(22) Filed: Dec. 14, 1999

(51) Int. Cl.$^7$ .............................. B60P 1/43; B62D 55/00
(52) U.S. Cl. .................. 180/9.1; 180/9.26; 180/907; 414/537; 414/921
(58) Field of Search ................... 180/9.1, 9.23, 180/6.6, 6.7, 9.26, 9.28, 9.42, 198, 907, 327; 280/DIG. 10, 5.22; 414/DIG. 921, 537, 469; 187/200, 243, 244

(56) References Cited

U.S. PATENT DOCUMENTS

| | | | | |
|---|---|---|---|---|
| 1,447,893 A | * | 3/1923 | Roy | |
| 2,592,023 A | | 4/1952 | Gleason | |
| 3,761,040 A | * | 9/1973 | Cummins | 180/9.2 |
| 3,921,740 A | | 11/1975 | Forster | |
| 3,926,272 A | * | 12/1975 | Weber | |
| 3,933,258 A | * | 1/1976 | Forsyth et al. | |
| 4,077,483 A | | 3/1978 | Randolph | |
| 4,121,788 A | * | 10/1978 | McMahon | 244/50 |
| 4,411,330 A | | 10/1983 | Blokland | |
| 4,518,057 A | | 5/1985 | McCallum | |
| 4,898,256 A | * | 2/1990 | Lehner | 180/8.2 |
| 4,898,508 A | | 2/1990 | Hayata | |
| 4,946,193 A | | 8/1990 | Oka | |
| 4,960,180 A | | 10/1990 | Livingston | |
| 5,094,314 A | * | 3/1992 | Hayata | 180/217 |
| 5,105,915 A | * | 4/1992 | Gary | 414/495 |
| 5,293,950 A | * | 3/1994 | Marliac | 180/11 |
| 5,322,408 A | * | 6/1994 | Wooden | 414/495 |
| 5,499,694 A | * | 3/1996 | Dorn | 187/200 |
| 6,102,645 A | * | 8/2000 | Kooima et al. | 414/537 |
| 6,133,856 A | * | 10/2000 | McCauley | 340/936 |

* cited by examiner

Primary Examiner—Anne Marie Boehler
(74) Attorney, Agent, or Firm—Ramon L. Pizarro; Edwin H. Crabtree

(57) ABSTRACT

A vehicle for transporting an individual on a wheel chair over land. The vehicle including a support platform with a first end, a second end, a mid-section and generally parallel sides; a first access platform attached to the first end of the support platform, a second access platform attached to the second end of the support platform. A mechanism, such as a pair of endless tracks at fixed location relative to the support platform will preferably be used for propelling the vehicle over land. A movable steering mechanism, such as a joy stick will be moveably attached to the support platform at approximately mid-section of the support platform, so that the vehicle is steerable by the individual on a wheel chair while facing either the first end of the support platform or the second end of the support platform. Additionally, it is contemplated that the joy stick or control mechanism may include a remote control signal transmitting and receiving system that allows the vehicle to be controlled by a second party walking along side the vehicle.

9 Claims, 4 Drawing Sheets

VEHICLE FOR WHEEL CHAIRS

BACKGROUND OF THE INVENTION (a) Field of the Invention

This invention generally relates to a vehicle that is used to transport individuals while on their wheel chairs. More particularly, but not by way of limitation, to an all terrain vehicle that provides access to its users from one end of the vehicle, and allows dismounting of the individual through another end.

(b) Discussion of Known Art

The problems associated with providing access to and from areas of public accommodation for people who rely on a wheelchair for mobility has gained a great deal of attention in recent years. This problem has become particularly perplexing or difficult to solve in areas of public accommodation such as ski resorts and the like, where visitors will encounter a wide variety of irregular terrain. Solutions for providing access to these places of public accommodation have included forming large ramps, roadways, or installing elevators, or other devices that pick up and carry the wheel chair and user from one level to the next.

An example of a known mechanism for carrying an individual from one level to the next is found in U.S. Pat. No. 4,411,330 to Blokland. The Blokland device is a stair climbing apparatus that uses a pair of endless tracks that support a platform that is pivotally connected to the endless tracks to allow changing of the angle of the platform relative to the endless track. Additionally, the Blokland device includes a lower level platform that allows access to the device from the lower, or ground, level, and an upper level platform that allows the user to exit the device at the top of the stairs. The lower level platform is longer than the upper level platform. The difference in length of the lower level platform versus the upper level platform is probably dictated by the fact that if the device stops near the upper landing, the distance from the platform to the landing is smaller than the distance from the platform to the ground when the device is stopped at ground level (following a trajectory that would provide a gradient suitable for easy access to the platform). This geometry and structure makes the Blokland device particularly well suited for addressing the problems associated carrying an individual up a set of stairs, but gives little guidance to the ordinary artisan on how to solve problems associated with other types of terrain. For example, if the individual needs to travel over snow covered terrain or across a ditch or other obstacle.

Another significant limitation encountered with the Blokland device is that it is not steerable by the user, and thus does not provide the user with the ability to use the device for purposes other than climbing stairs. Still further, the structure of the lower level platform of Blokland device would not permit the user to see in the direction of travel if moving in the direction of the lower level platform.

Known devices which allow the user to steer and control the direction of movement of a device that carries an individual while seated in a wheel chair include U.S. Pat. No. 4,946,193 to Oka; U.S. Pat. No. 4,960,180 to Livingston; U.S. Pat. No. 4,898,508 to Hayata; U.S. Pat. No. 4,518,057 to McCallum; and U.S. Pat. No. 3,921,740 to Forster. Known devices that describe transportation devices with a pair of endless tracks include U.S. Pat. No. 4,077,483 to Randolph and U.S. Pat. No. 2,592,023 to Gleason.

A review of these known devices reveals that there remains a need for a transportation device that allows individuals on a wheelchair to climb into and exit the device without having to leave the wheelchair and without having to move the wheelchair in a backwards direction to exit the device. Still further, there remains a need for a transportation device that allows an individual on a wheelchair to negotiate a variety of terrain features, includeing snowy terrain, rocky terrain, deep sand or simply wet or irregular terrain without being constrained as to the direction of access to and from the vehicle in order to be able to steer the vehicle to and from the area being accessed.

Thus, a review of known devices reveals that there remains a need for a transportation device that is simple, robust, and allows easy access to a driving position on the device while using a wheel chair.

There remains a need for a transportation device that allows an individual on a wheel chair to sit, operate and steer the vehicle while sitting facing one direction or while sitting facing an opposite direction.

SUMMARY

It has been discovered that the problems left unanswered by known art can be solved by providing a vehicle for transporting an individual on a wheel chair over land, the vehicle being operable and steerable by the individual the vehicle including:

a) a support platform having a first end, a second end, a mid-section and generally parallel sides, the generally parallel sides being raised over the support platform to define a pathway over the support platform, the pathway extending from the first end to the second end of the support platform; and b) a steering device attached to at least one of the generally parallel sides at a position over the mid-section of said support platform, so that the vehicle is steerable by the individual on a wheel chair while facing either the first end of said support platform or the second end of said support platform. According to a highly preferred embodiment of the invention, the vehicle includes a pair of access platforms that are attached to the ends of the support platform. These access platforms will provide a gently sloping gradient for access to the support platform. In this highly preferred embodiment of the invention the platforms are hingeldy connected to the vehicle to allow the platforms to pivot from a first position where the platforms cooperate with the sides of the vehicle to enclose the area where the user will sit, to a second position, where the access platforms tilt down to provide an access ramp to the support platform. It is also contemplated that the access platforms may be removable or include a mechanism that raises and lowers the access platforms in a parallel manner relative to the support platform.

According to this highly preferred embodiment, the vehicle will be electrically propelled along a pair of generally parallel propulsion devices, such as at least two wheels, or a pair of endless tracks. In a highly preferred embodiment of the invention a pair of endless tracks that are generally parallel to the sides of the support platform are used to propel and steer the vehicle.

Additionally, it is important to note that by positioning the steering mechanism or systems on one of the sides of the support platform, at a location that is approximately equidistant form the access platform allows the vehicle to be steerable by an individual while facing either access platform. Thus, according to one embodiment of the invention, the steering mechanism includes a joy stick or similar transdoucing device with a wireless remote control type signal used to send the control signal from the joy stick to the drive mechanism of the vehicle.

Additionally, it will be understood that the disclosed invention provides a transportation system that can be used over a wide variety of terrains, including snow, sand, irregular surfaces and so on, to allow individuals on a wheel chair to go over or avoid terrain that would be otherwise extremely difficult to negotiate while on a wheel chair.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
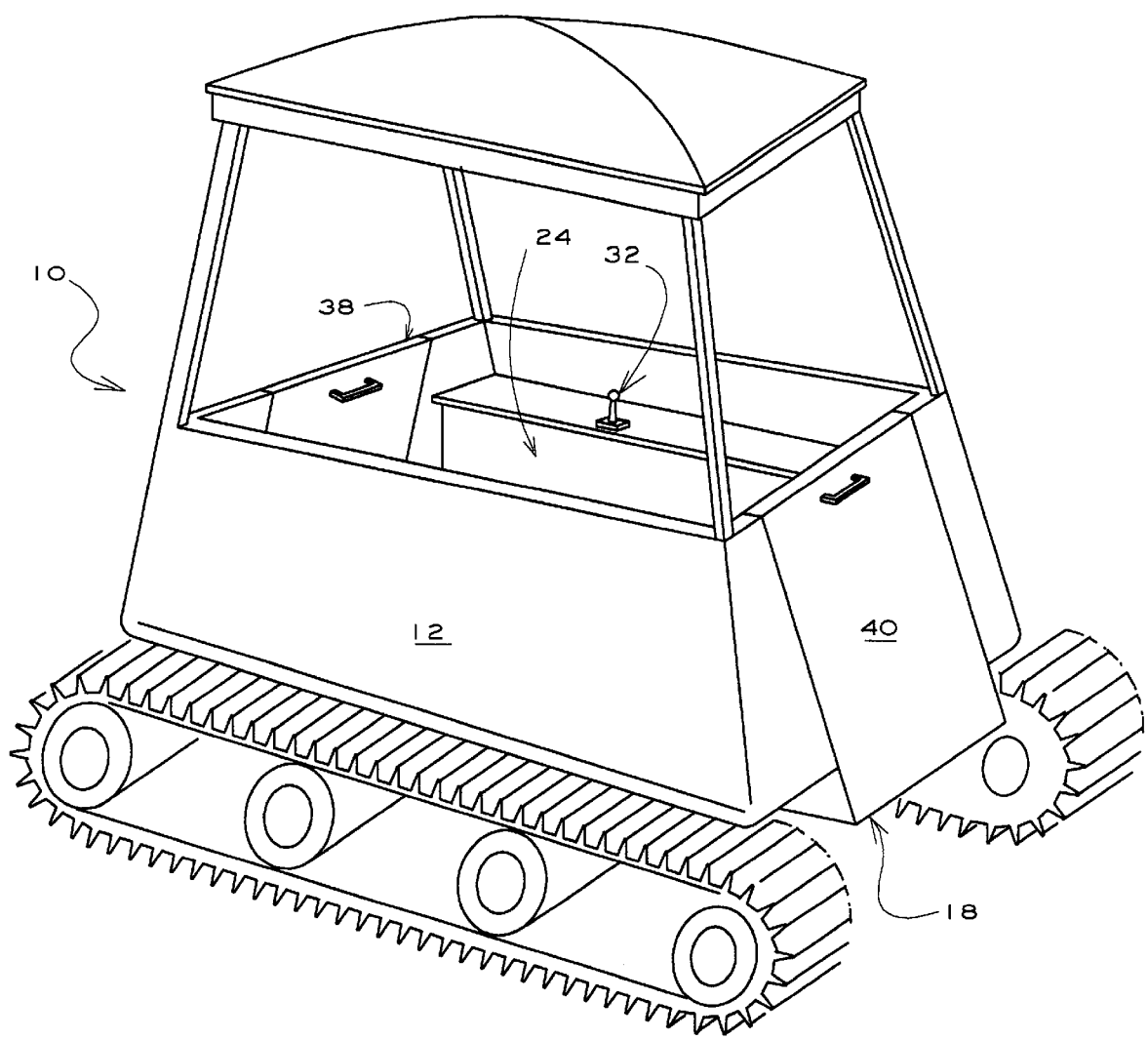
FIG. 1 is a perspective view of a highly preferred embodiment of the invention, the illustrated embodiment including an optional canopy.

Turning now to FIG. 1 where a vehicle 10 for transporting an individual on a wheel chair over land. It is contemplated that the vehicle 10 will be operable and steerable by the individual, whether the individual faces either direction along the body 12 of the vehicle 10.

Figure 2:
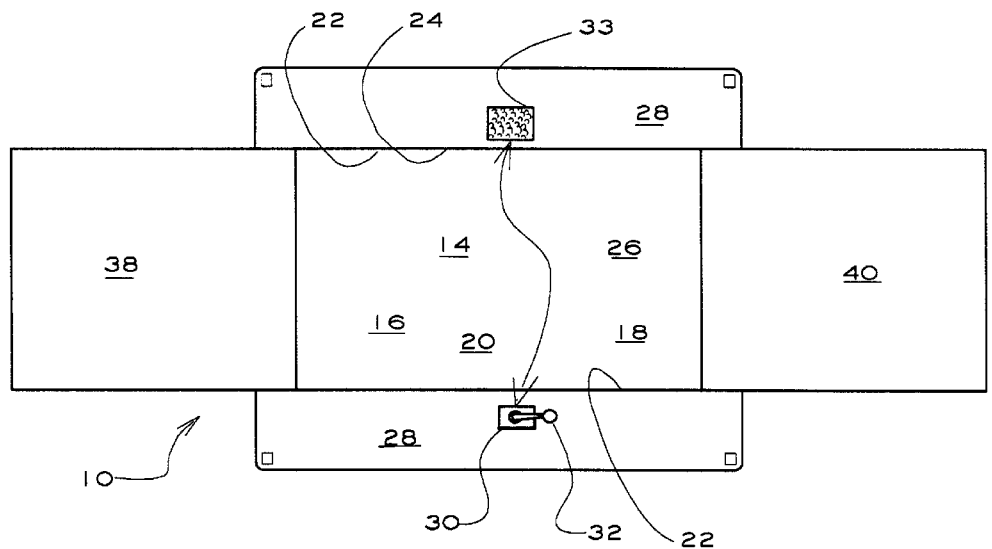
FIG. 2 is a plan view of the support platform used with the disclosed invention. The view also illustrates the hinged connection of the access platforms to the support platform.

As can be understood from FIGS. 1 and 2, a highly preferred embodiment of the invention will include a body 12 with a support platform 14. The support platform 14 will preferably include having a first end 16, a second end 18, a mid-section 20 and generally parallel sides 22. From the generally parallel sides 22 will extend side panels 24 that will extend over the support platform 14 to define a pathway 26 over the support platform 14. As can be understood from FIG. 2, the pathway 26 will extend between the first end 16 and the second end 18 of the support platform 14.

Also shown on FIGS. 1 and 2 is that it is contemplated that the side panels 24 will terminate in generally flat or seat surfaces 28 that extend along both sides 22 of the support platform 14. It is further contemplated that along these surfaces 28, or along the sides 22, a steering means 30 will be supported. In a highly preferred embodiment, these steering means 30 will include a joy stick 32, which simply a pole-type control which supports hand operated buttons which can in turn control various functions of the vehicle 10. The joy stick 32 will control the functions of the vehicle by any known means. For example, it is contemplated that the joy stick 32 will be electrically connected to a control module that will accept signals from the joy stick 32 and control functions such as velocity, direction of travel, or stopping, by controlling drive mechanism 34 that is incorporated into the system. It is important to note that while it is contemplated that the control signals may be transmitted by way of a wireless, remote control signal, allowing the vehicle to be controlled from a distance such as by a person moving along side the vehicle. Additionally, it is contemplated that the joy stick 32 will be movably or removably attached along any of the seat surfaces 28. Attachment to the seat surfaces 28 may be accomplished by way of a hook and loop type base attachment 33, which accepts mating material on the joy stick 32. Signals and power to operate the joy stick 32 would then be provided by plug-in type sockets or batteries housed within the joy stick 32, which then use infrared or electrical pulse or similar signals to transmit the control signals that will eventually be used to control the control module 44. As will be discussed in further detail below, the drive mechanism 34 will preferably be of the type that uses a pair of means for moving the device, such as a pair of rows of wheels or a pair of endless tracks 36 as illustrated.

Figure 3:
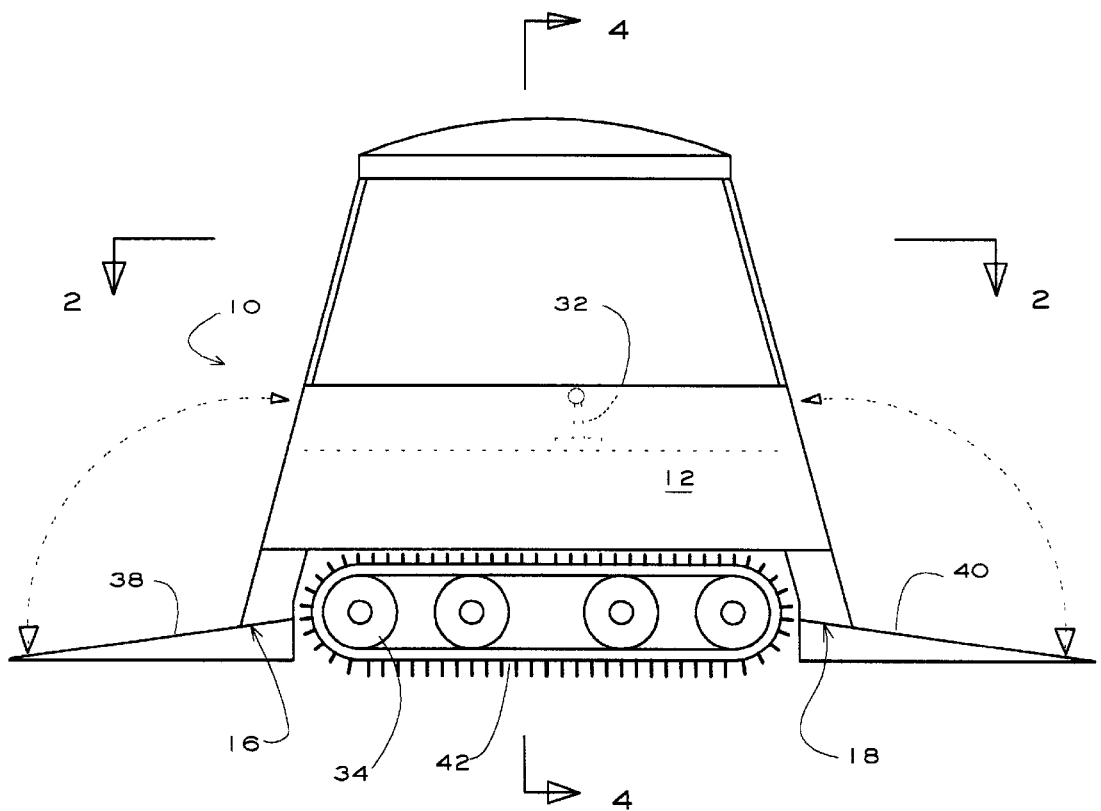
FIG. 3 is a side elevational view of a highly preferred embodiment of the invention. The view also illustrates the range of motion of the access platforms and the cooperation of the access platforms with the sides extending from the support platform.

Referring now to both FIGS. 2 and 3, where a pair of access platforms have been illustrated as connected to the support platform 14. As illustrated, it is contemplated that a first access platform 38 will be pivotally connected to the first end 16 of the support platform 14, and that a second access platform 40 will be pivotally connected to the second end 18 of the support platform 14. It is important to note that while the preferred embodiment includes pivotal connections, it is also contemplated that hydraulically actuated rising and lowering platforms could also be used. However, it is preferred that the access platforms include and ability to raise the platforms such that the access platforms may be used for closing off the area around the support platform.

Figure 4:
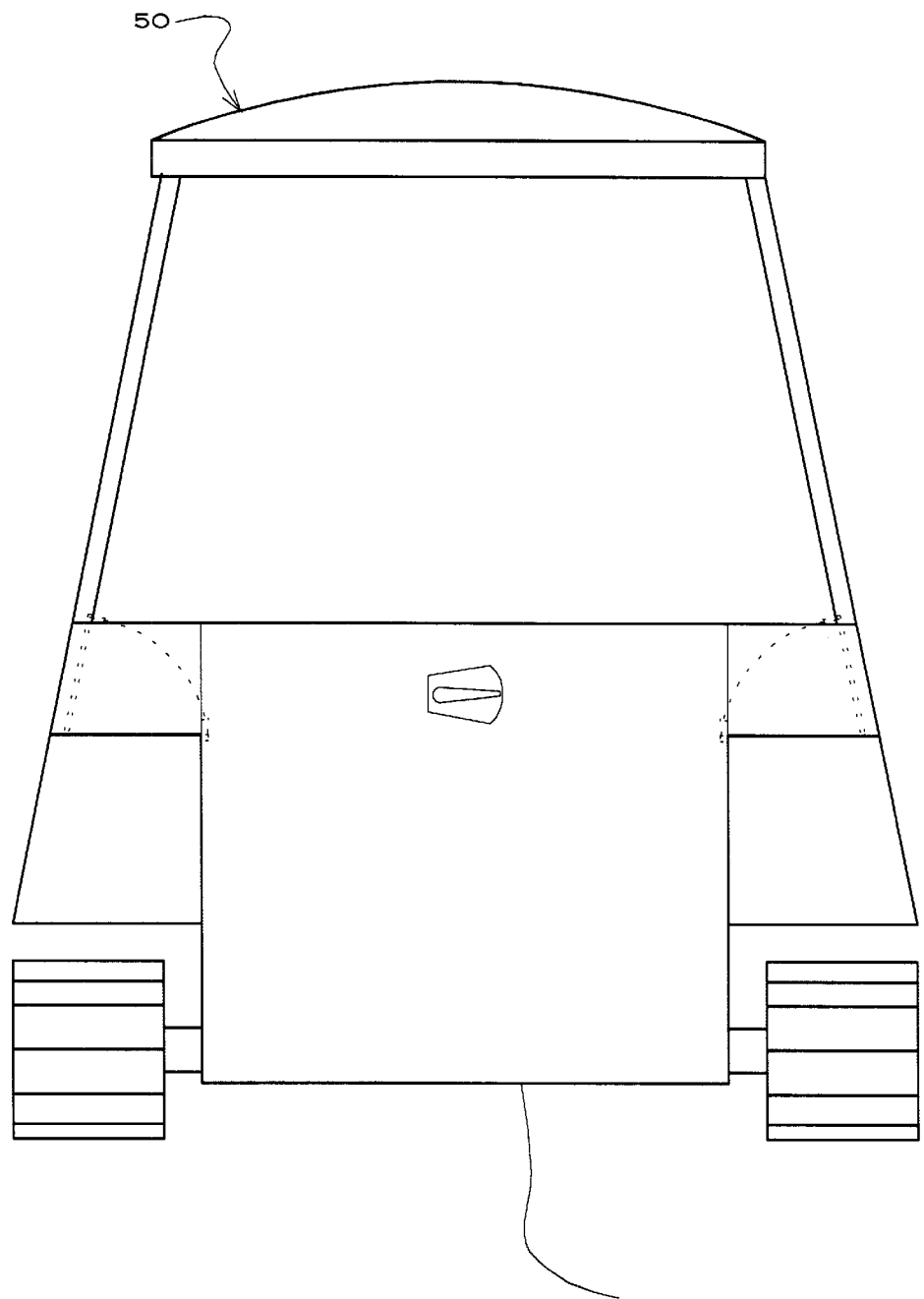
FIG. 4 is an end elevational view illustrating the path through the invention as created when the access platforms are lowered.

As illustrated in FIG. 3, it is contemplated that the access platforms will cooperate with the side panels 24 of the body 12 to enclose the support platform. Also, as shown on FIG. 3, the support platform 14 is at a relatively low level to the ground, preferably below the highest point on the endless tracks 42 of the drive mechanism. This arrangement will allow the first access platform 38 and the second access platform 40 to form a gradual gentle gradient from the support platform 14 to the ground once the first access platform 38 and the second access platform 40 are lowered as shown on FIGS. 2, 3, and 4. The gradual gradient formed by the access platforms allows easy entry and exit from the device while operating a wheel chair.

It is also important to note that the disclosed arrangement allows the user to carry passengers seated along the seat surfaces 28. The fact that the access surfaces close off the support surface, and the fact that the steering mans can be relocated, allow the vehicle 10 to be used in transporting severely handicapped individuals on a wheelchair by moving the steering means to a location along one of the sides where an assistant may steer the vehicle 10 while the severely handicapped individual in the wheelchair is retained between the side panels 24 and the access platforms.

Also shown on FIG. 3 is that because the disclosed invention incorporates the use of a steering means such as a joy stick 32, it is contemplated that the position of the joy stick 32 may be varied along the sides panels 24 or the seat surfaces 28. The attachment may accomplished by way of hook and loop attachment mechanisms or other mechanical or equivalent attachment means. However, it is important to note that the fact that the location of the joy stick 32 can be changed allows the vehicle 10 to be operated by an individual who is seated facing the first access platform 38 or the second access platform 40. This in turn allows the user to approach the vehicle from either access platform and drive the vehicle 10 in a completely bi-directional manner. attached to at least one of the generally parallel sides at a position over the mid-section of said support platform, so that the vehicle is steerable by the individual on a wheel chair while facing either the first end of said support platform or the second end of said support platform.

Figure 5:
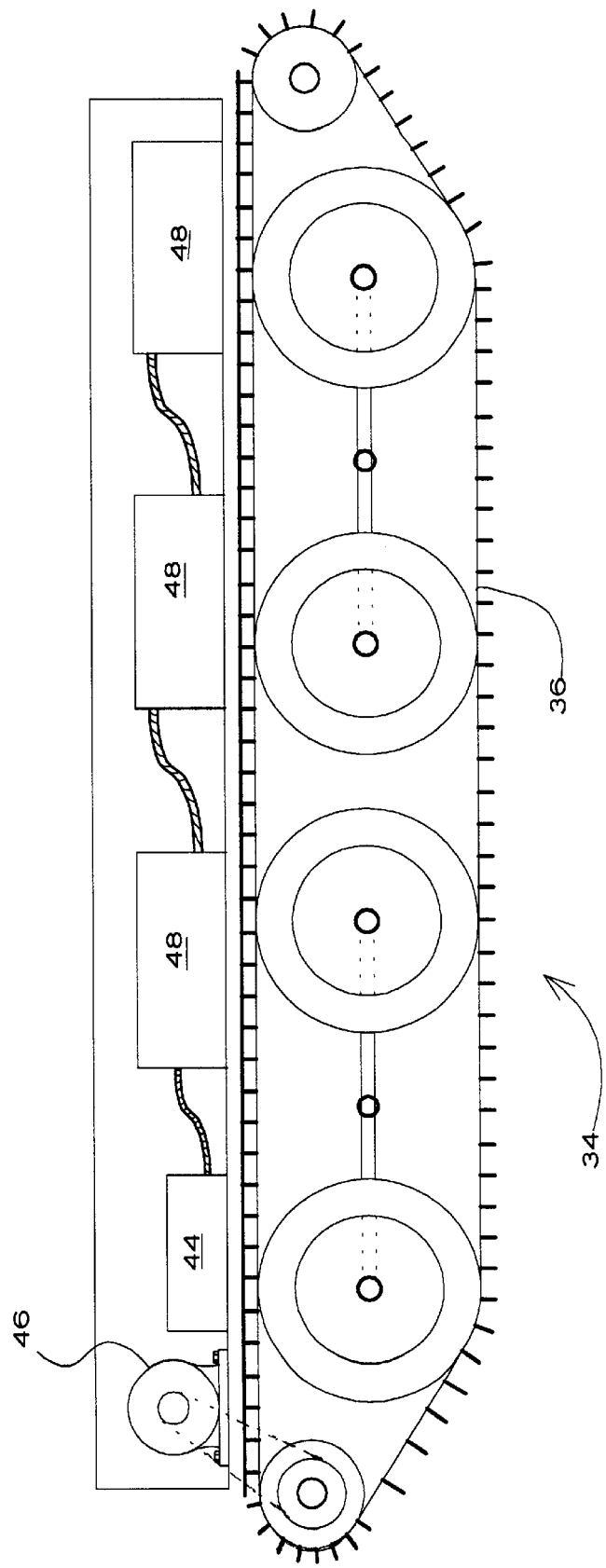
FIG. 5 illustrates the contemplated arrangement of an endless track system used with the invention and which allows driving and steering of the invention in either direction, without having a defined or fixed front or forward direction or fixed rear or reverse direction.

Turning now to FIG. 5 where the means for propelling the vehicle 10, in the preferred embodiment the pair of endless tracks 42, have been illustrated in greater detail. As illustrated, it is contemplated that the tracks 42 will be generally parallel to the sides 22 of the support platform 14 and at a fixed orientation or angle relative to the support platform 14. It is contemplated that the electrical signals generated and delivered by the joy stick 32 will be accepted by the control module or unit 44, which in turn will control the operation of an electric motor 46. The motor 46 will preferably be powered by a series of batteries 48. This arrangement will allow unimpeded operation of the vehicle 10 towards the first access platform 38 or towards the second access platform 40 with little, if any, difference or variation in operation. The circuitry of the control module 44 as well as other mechanical or electrical details are contemplated to be one of many circuits or endless track mechanisms that are commercially available. Also, as mentioned above, it is also contemplated that tires or wheels could be used in place of the endless track. However, the endless track is preferred for its ability to negotiate uneven or irregular terrain.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A vehicle for transporting an individual on a wheel chair over land, the vehicle being operable and steerable by the individual, the vehicle comprising:

a support platform having a first end, a second end, a mid-section and generally parallel sides;

a first access platform attached to the first end of the support platform, a second access platform attached to the second end of the support platform;

a set of endless tracks being driven by a motor that is permantly attached to the support platform, the endless tracks being generally parallel to the sides of the support platform; and a steering mechanism attached to the support platform at approximately mid-section of said support platform, so that the vehicle is steerable by the individual on a wheel chair while facing either the first end of said support platform or the second end of said support platform.

2. A vehicle according to claim 1 wherein said sides of the support platform extend over the support platform to a distance above the support platform, and said first access platform and said second access platform are each movable to a position where the first access platform and the second access platform contact the sides of the support platform and close off the support platform.

3. A vehicle according to claim 2 wherein said steering mechanism is positioned on one of the sides of the support platform, at a location that is approximately equidistant from said first access platform and said second access platform, so that the vehicle is steerable by an individual while facing the first access platform or while facing the second access platform.

4. A vehicle according to claim 1 wherein said steering mechanism comprises a joy-stick electrically connected to an electrical drive motor.

5. A vehicle for transporting an individual on a wheel chair over land, the vehicle being operable and steerable by the individual, the vehicle comprising:

a support platform having a first end, a second end, a mid-section and generally parallel sides;

a first access platform attached to the first end of the support platform, a second access platform attached to the second end of the support platform;

a pair of endless tracks mounted in a generally fixed arrangement relative to said support platform the endless tracks being driven by a motor that is permanently attached to the support platform; and steering means attached to the support platform at approximately mid-section of said support platform, so that the vehicle is steerable by the individual on a wheel chair while facing either the first end of said support platform or the second end of said support platform.

6. A vehicle according to claim 5 wherein said sides of the support platform extend over the support platform to a distance above the support platform, and said first access platform and said second access platform are each movable to a position where the first access platform and the second access platform contact the sides of the support platform and close off the support platform.

7. A vehicle according to claim 5 wherein said steering means are positioned on one of the sides of the support platform, at a location that is approximately equidistant from said first access platform and said second access platform, so that the vehicle is steerable by an individual while facing the first access platform or while facing the second access platform.

8. A vehicle for transporting an individual on a wheel chair over land, the vehicle being operable and steerable by the individual, the vehicle comprising:

a support platform having a first end, a second end, a mid-section and generally parallel sides, the generally parallel sides being raised over the support platform to define a pathway over the support platform, the pathway extending from the first end to the second end of the support platform;

a first access platform pivotally connected to the first end of the support platform;

a second access platform pivotally connected to the second end of the support platform;

a pair of endless tracks mounted in a generally fixed arrangement relative to said support platform the endless tracks being driven by a motor that is permanently attached to the support platform; and steering means attached to at least one of the generally parallel sides at a position over the mid-section of said support platform, so that the vehicle is steerable by the individual on a wheel chair while facing either the first end of said support platform or the second end of said support platform.

9. A vehicle according to claim 8 wherein said sides of the support platform extend over the support platform to a distance above the support platform, and said first access platform and said second access platform are each movable to a position where the first access platform and the second access platform contact the sides of the support platform and close off the support platform.

* * * * *